US011334267B1

(12) United States Patent
Rao et al.

(10) Patent No.: US 11,334,267 B1
(45) Date of Patent: May 17, 2022

(54) APPARATUS, SYSTEM, AND METHOD FOR DYNAMICALLY SIZING MEMORY POOLS BASED ON TRACKED MEMORY WASTE

(71) Applicant: Juniper Networks, Inc., Sunnyvale, CA (US)

(72) Inventors: Amit Kumar Rao, Sunnyvale, CA (US); Erin C. MacNeil, Sunnyvale, CA (US); Finlay Michael Graham Pelley, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 30 days.

(21) Appl. No.: 16/940,420

(22) Filed: Jul. 28, 2020

(51) Int. Cl.
*G06F 3/06* (2006.01)
(52) U.S. Cl.
CPC ............ *G06F 3/064* (2013.01); *G06F 3/0604* (2013.01); *G06F 3/0676* (2013.01); *G06F 3/0677* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 7,334,104 | B2 * | 2/2008 | Piper | G06F 9/5016 711/170 |
| 7,469,329 | B2 * | 12/2008 | Kuczynski | G06F 16/22 711/170 |
| 9,811,453 | B1 * | 11/2017 | Vaduvatha | G06F 13/16 |
| 2004/0193775 | A1 * | 9/2004 | Van Doren | G06F 12/023 711/1 |

OTHER PUBLICATIONS

Uchechukwu Awada and Adam Barker. 2017. Improving Resource Efficiency of Container-instance Clusters on Clouds. In <i> Proceedings of the 17th IEEE/ACM International Symposium on Cluster, Cloud and Grid Computing</i> (<i>CCGrid '17</i>). IEEE Press, 929-934. (Year: 2017).*
Samir R. Das and Richard M. Fujimoto. 1994. An adaptive memory management protocol for Time Warp parallel simulation. In Proceedings of the 1994 ACM SIGMETRICS conference on Measurement and modeling of computer systems (SIGMETRICS '94). Association for Computing Machinery, New York, NY, USA,201-210. (Year: 1994).*

(Continued)

*Primary Examiner* — Daniel C. Chappell
(74) *Attorney, Agent, or Firm* — FisherBroyles, LLP (57) ABSTRACT

A disclosed method may include (1) detecting one or more requests for a memory chunk of a specific size on a computing device, (2) determining that the computing device has yet to implement a memory pool dedicated to fixed memory chunks of the specific size, (3) computing an amount of memory that is potentially wasted in part by satisfying the one or more requests from an existing memory pool dedicated to fixed memory chunks of a different size, (4) determining that the amount of memory that is potentially wasted exceeds a waste threshold, and then in response to determining that the amount of memory that is potentially wasted exceeds the waste threshold, (5) creating an additional memory pool dedicated to fixed memory chunks of the specific size on the computing device. Various other apparatuses, systems, and methods are also disclosed.

20 Claims, 7 Drawing Sheets

(56) References Cited

OTHER PUBLICATIONS

D. Ma, W. Yueqing and Y. Yan, "A wear-leveling algorithm based on IO request prediction," 2012 3rd International Conference on System Science, Engineering Design and Manufacturing Informatization, 2012, pp. 288-291. (Year: 2012).*

W. Feng, C. Liu, Z. Guo, T. Baker, B. Cheng and J. Chen, "Data Loss Prevention and Storage Utilization Improvement of the Hidden Volume on Mobile Devices," 2019 IEEE Symposium on Computers and Communications (ISCC), 2019, pp. 1-6. (Year: 2019).*

\* cited by examiner

Waste Analysis
500

| Requested Size | Wasted Memory Per Request | Number of Requests | Total Wasted Memory | New Memory Pool? |
|---|---|---|---|---|
| 88 Bytes | 40 Bytes | 1 | 40 Bytes | No |
| 96 Bytes | 32 Bytes | 1 | 32 Bytes | No |
| 104 Bytes | 24 Bytes | 5 | 120 Bytes | Yes |
| 112 Bytes | 16 Bytes | 2 | 32 Bytes | No |
| 120 Bytes | 8 Bytes | 1 | 8 Bytes | No |

APPARATUS, SYSTEM, AND METHOD FOR DYNAMICALLY SIZING MEMORY POOLS BASED ON TRACKED MEMORY WASTE

BACKGROUND

Computing devices often implement memory pools that involve and/or include preallocated memory chunks of fixed sizes. For example, a computing device may preallocate a memory pool that includes and/or represents various 128-byte memory chunks. Such memory pools may mitigate fragmentation caused by and/or resulting from the implementation of variable memory sizes.

Unfortunately, although they may mitigate such fragmentation, memory pools may also cause and/or result in a certain amount of memory waste. For example, the computing device may satisfy requests for a range of memory sizes by allocating 128-byte chunks from that memory pool. In this example, some of those requests may be directed to memory chunks smaller than 128 bytes. In other words, the computing device may satisfy those memory requests from the memory pool even though the requested memory size is smaller than the 128-byte chunks included in the memory pool, thereby leading to a certain amount of memory waste.

The instant disclosure, therefore, identifies and addresses a need for additional and improved apparatuses, systems, and methods for dynamically sizing memory pools based on tracked memory waste.

SUMMARY

As will be described in greater detail below, the instant disclosure generally relates to apparatuses, systems, and methods for dynamically sizing memory pools based on tracked memory waste. In one example, a method for accomplishing such a task may include (1) detecting one or more requests for a memory chunk of a specific size on a computing device, (2) determining that the computing device has yet to implement a memory pool dedicated to fixed memory chunks of the specific size, (3) computing an amount of memory that is potentially wasted in part by satisfying the one or more requests from an existing memory pool dedicated to fixed memory chunks of a different size, (4) determining that the amount of memory that is potentially wasted exceeds a waste threshold, and then in response to determining that the amount of memory that is potentially wasted exceeds the waste threshold, (5) creating an additional memory pool dedicated to fixed memory chunks of the specific size on the computing device.

Similarly, a system that implements the above-identified method may include a physical processing device configured to execute various modules stored in memory. In one example, this system may include and/or execute (1) a detection module that detects one or more requests for a memory chunk of a specific size, (2) a determination module that determines that the computing device has yet to implement a memory pool dedicated to fixed memory chunks of the specific size, (3) a calculation module that computes an amount of memory that is potentially wasted in part by satisfying the one or more requests from an existing memory pool dedicated to fixed memory chunks of a different size, wherein the determination module further determines that the amount of memory that is potentially wasted exceeds a waste threshold, and (4) a pooling module that creates an additional memory pool dedicated to fixed memory chunks of the specific size in response to the determination that the total amount of memory that is potentially wasted exceeds the waste threshold.

Additionally or alternatively, an apparatus that implements the above-identified method may include a memory device that includes a plurality of memory chunks of a fixed size. This apparatus may also include at least one physical processing device communicatively coupled to the memory device. This physical processing device may (1) detects one or more requests for a memory chunk of a specific size (2) determines that the memory device has yet to implement a memory pool dedicated to memory chunks of the specific size, (3) computes an amount of memory that is potentially wasted in part by satisfying the one or more requests from an existing memory pool dedicated to the memory chunks of the fixed size, (4) determines that the amount of memory that is potentially wasted exceeds a waste threshold, and (5) creates an additional memory pool dedicated to memory chunks of the specific size in response to determining that the amount of memory that is potentially wasted exceeds the waste threshold.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for dynamically sizing memory pools based on tracked memory waste. As will be explained in greater detail below, the various apparatuses, systems, and methods described herein may provide benefits and/or advantages over some traditional fixed-sized memory pool technologies. For example, the various apparatuses, systems, and methods described herein may track the amount of memory that is wasted by satisfying requests for a certain sized memory chunk from a first memory pool that includes larger memory chunks. In this example, these apparatuses, systems, and methods may determine whether that amount of wasted memory exceeds a certain waste threshold.

If that amount of wasted memory does end up exceeding the waste threshold, these apparatuses, systems, and methods may create a second memory pool dedicated to memory chunks of that certain size. By doing so, these apparatuses, systems, and methods may satisfy subsequent requests for that size of memory chunk from the second memory pool rather than the first memory pool. As a result, these apparatuses, systems, and methods may enable computing devices to mitigate memory waste in connection with fixed-sized memory pools, thereby improving the memory and/or resource efficiency of those computing devices.

The following will provide, with reference to FIGS. 1, 2, and 4-6, detailed descriptions of exemplary apparatuses, systems, and corresponding implementations for dynamically sizing memory pools based on tracked memory waste. Detailed descriptions of an exemplary method for dynamically sizing memory pools based on tracked memory waste will be provided in connection with FIG. 3. In addition, detailed descriptions of an exemplary computing system for carrying out such a method will be provided in connection with FIG. 7.

Figure 1:
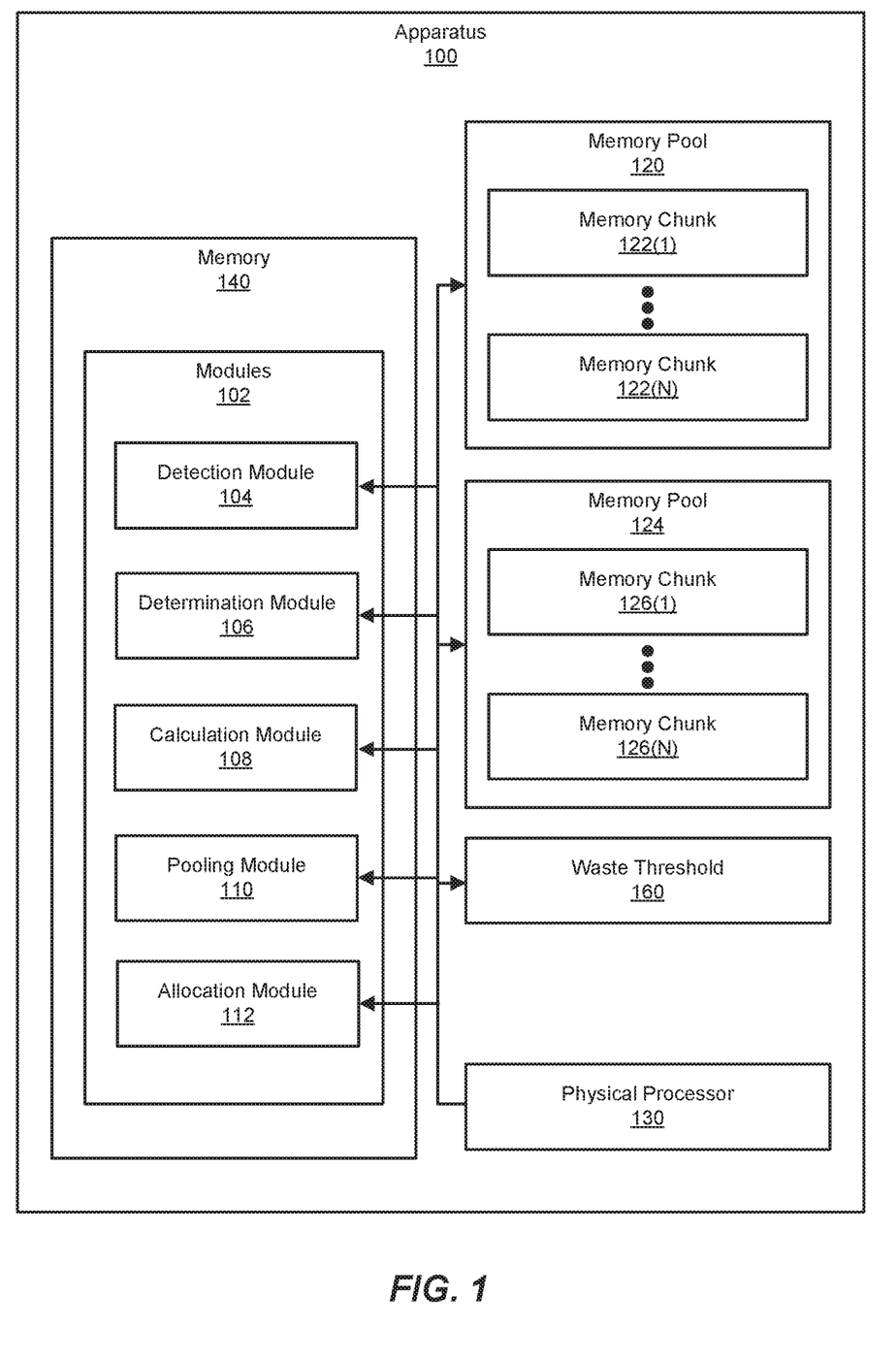
FIG. 1 is a block diagram of an exemplary apparatus for dynamically sizing memory pools based on tracked memory waste.

FIG. 1 shows an exemplary apparatus 100 that facilitates dynamically sizing memory pools based on tracked memory waste. As illustrated in FIG. 1, apparatus 100 may include one or more modules 102 for performing one or more tasks. As will be explained in greater detail below, modules 102 may include a detection module 104, a calculation module 108, a determination module 106, a pooling module 110, and an allocation module 112. Although illustrated as separate elements, one or more of modules 102 in FIG. 1 may represent portions of a single module application, process, and/or operating system. For example, one or more of modules 102 may represent and/or be implemented as part of a writer running on and/or executed by apparatus 100. Additionally or alternatively, one or more of modules 102 may represent and/or be implemented as part of an allocator that manages memory and/or services memory allocations.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing devices 202, 224, and 226) and/or computing system 700 illustrated in FIG. 7. One or more of modules 102 in FIG. 1 may also represent all or portions of one or more special-purpose computers configured to perform one or more tasks.

As illustrated in FIG. 1, exemplary apparatus 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary apparatus 100 may also include one or more physical processing devices, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to dynamically size memory pools based on tracked memory waste. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary apparatus 100 may also include and/or represent one or more memory pools, such as memory pools 120 and 124. In one example, memory pool 120 may include and/or represent a set of memory chunks 122(1)-(N). In this example, memory chunks 122(1)-(N) may include and/or represent fixed portions of memory that have been preallocated within apparatus 100. Accordingly, all of memory chunks 122(1)-(N) may include and/or represent the same size of memory segment, section, and/or block.

In one example, memory pool 124 may include and/or represent a set of memory chunks 126(1)-(N). In this example, memory chunks 126(1)-(N) may include and/or represent fixed portions of memory that have been preallocated within apparatus 100. Accordingly, all of memory chunks 126(1)-(N) may include and/or represent the same size of memory segment, section, and/or block. In certain embodiments, memory chunks 126(1)-(N) may be of a different size than memory chunks 122(1)-(N).

Figure 2:
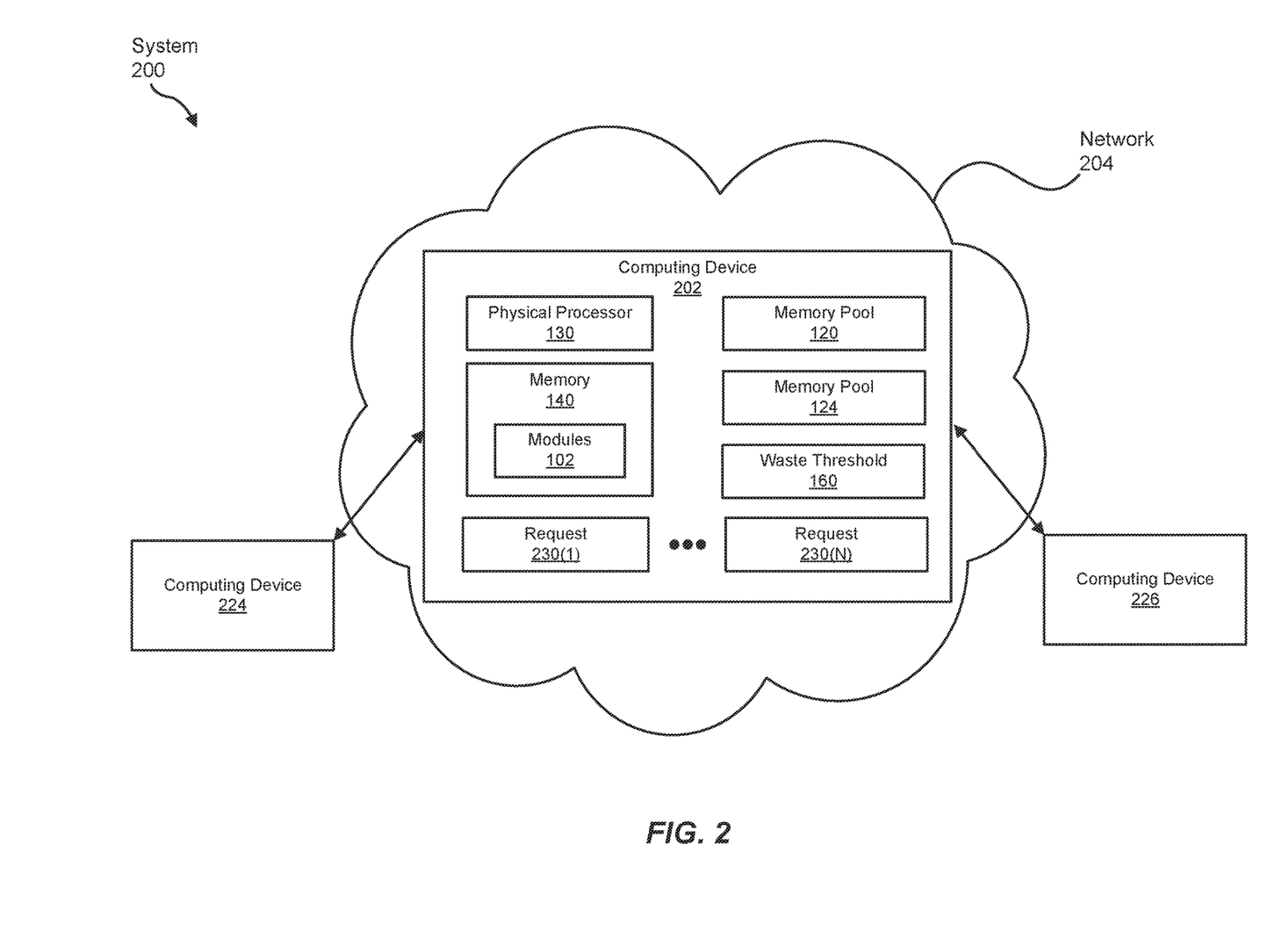
FIG. 2 is a block diagram of an exemplary system for dynamically sizing memory pools based on tracked memory waste.

In some examples, apparatus 100 in FIG. 1 may be implemented in a variety of ways. For example, all or a portion of exemplary apparatus 100 may represent portions of exemplary system 200 in FIG. 2. As shown in FIG. 2, system 200 may include a network 204 that facilitates communication among various computing devices (such as computing devices 202, 224, and 226). Although FIG. 2 illustrates computing devices 224 and 226 as being external to network 204, computing devices 224 and 226 may alternatively represent part of and/or be included within network 204.

In some examples, network 204 may include and/or represent various network devices that form and/or establish communication paths and/or segments. For example, network 204 may include and/or represent one or more segment routing paths. Although not illustrated in this way in FIG. 2, network 204 may include and/or represent one or more additional network devices and/or computing devices.

In some examples, and as will be described in greater detail below, one or more of modules 102 may cause computing device 202 to (1) detect one or more requests for a memory chunk of a specific size, (2) determine that computing device 202 has yet to implement a memory pool dedicated to fixed memory chunks of the specific size, (3) compute an amount of memory that is potentially wasted in part by satisfying the one or more requests from an existing memory pool dedicated to fixed memory chunks of a different size, (4) determine that the amount of memory that is potentially wasted exceeds a waste threshold, and then in response to determining that the amount of memory that is potentially wasted exceeds the waste threshold, (5) create an additional memory pool dedicated to fixed memory chunks of the specific size on the computing device.

Computing devices 202, 224 and 226 each generally represent any type or form of physical computing device capable of reading computer-executable instructions and/or handling network traffic. Examples of computing devices 202, 224, and 226 include, without limitation, routers (such as provider edge routers, hub routers, spoke routers, autonomous system boundary routers, and/or area border routers), switches, hubs, modems, bridges, repeaters, gateways (such as Broadband Network Gateways (BNGs)), multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable computing devices.

Network 204 generally represents any medium or architecture capable of facilitating communication or data transfer. In some examples, network 204 may include other devices not illustrated in FIG. 2 that facilitate communication and/or form part of routing paths among computing devices 202, 224, and 226. Network 204 may facilitate communication or data transfer using wireless and/or wired connections. Examples of network 204 include, without limitation, an intranet, an access network, a layer 2 network, a layer 3 network, a Multiprotocol Label Switching (MPLS) network, an Internet Protocol (IP) network, a heterogeneous network (e.g., layer 2, layer 3, IP, and/or MPLS) network, a Wide Area Network (WAN), a Local Area Network (LAN) a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
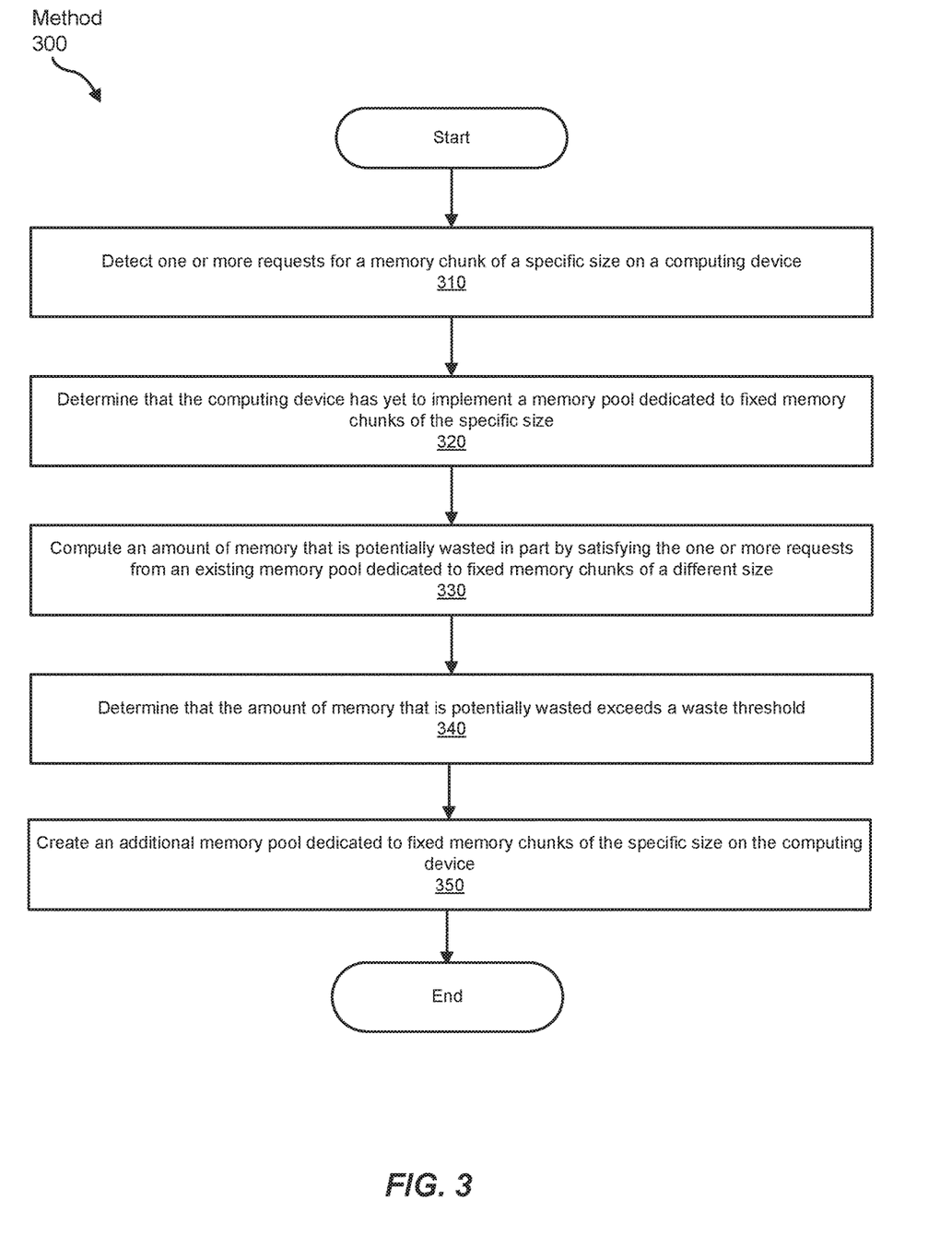
FIG. 3 is a flow diagram of an exemplary method for dynamically sizing memory pools based on tracked memory waste.

FIG. 3 is a flow diagram of an exemplary computer-implemented method 300 for dynamically sizing memory pools based on tracked memory waste. The steps shown in FIG. 3 may be performed by any suitable computer-executable code and/or computing system, including apparatus 100 in FIG. 1, system 200 in FIG. 2, computing system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may detect one or more requests for a memory chunk of a specific size on a computing device. For example, detection module 104 may, as part of computing device 202 in FIG. 2, detect one or more requests 230(1)-(N) for a memory chunk of a specific size on computing device 202. In one example, requests 230(1)-(N) may all be directed to the same size of memory chunk.

The systems described herein may perform step 310 in a variety of ways and/or contexts. In some examples, detection module 104 may monitor computing device 202 for memory allocation requests. While monitoring computing device 202 in this way, detection module 104 may identify and/or detect one or more of requests 230(1)-(N). For example, a user-space application a kernel-space process, and/or a writer running on computing device 202 may generate and/or issue various memory allocation requests. In this example, an allocator that manages memory chunks on computing device 202 may receive and/or obtain these memory allocation requests.

In some embodiments, one or more of requests 230(1)-(N) may be directed to a memory allocation characterized by a byte count that is not a power of two. As a specific example, one or more of requests 230(1)-(N) may be directed to a 50-byte memory allocation. In other embodiments, one or more of requests 230(1)-(N) may be directed to a memory allocation characterized by a power-of-two byte count. As a specific example, one or more of requests 230(1)-(N) may be directed to a 64-byte memory allocation.

Returning to FIG. 3, at step 320 one or more of the systems described herein may determine that the computing device has yet to implement a memory pool dedicated to fixed memory chunks of the specific size. For example, determination module 106 may, as part of computing device 202 in FIG. 2, determine that computing device 202 has yet to implement a memory pool dedicated to fixed memory chunks of the specific size. In other words, determination module 106 may determine that the specific size of memory chunk requested by and/or identified in one or more of requests 230(1)-(N) has not been preallocated in an existing memory pool.

The systems described herein may perform step 320 in a variety of ways and/or contexts. In some examples, determination module 106 may compare the requested size of memory chunk against all existing memory pools on computing device 202. For example, determination module 106 may search for and/or identify all existing memory pools that have been preallocated on computing device 202 at any given time. In this example, determination module 106 may compare the size of memory allocation identified in one or more of requests 230(1)-(N) against all those memory pools. Determination module 106 may then determine that the size of memory allocation identified in such requests does not match the fixed size of memory chunks included in any of those memory pools.

In one example, determination module 106 may determine that no fixed-sized memory pools have been created and/or implemented at the point in time that the memory allocation is requested. As a result, determination module 106 may determine that computing device 202 has yet to implement a memory pool dedicated to fixed memory chunks of the specific size.

In another example, determination module 106 may identify memory pool 120 as the only one created and/or implemented on computing device 202 at the point in time that the memory allocation is requested. In this example, memory pool 120 may be dedicated to memory allocations of a different size than one or more of requests 230(1)-(N). As a result, determination module 106 may determine that computing device 202 has yet to implement a memory pool dedicated to fixed memory chunks of the specific size.

In a further example, determination module 106 may identify memory pools 120 and 124 as the only ones created and/or implemented on computing device 202 at the point in time that the memory allocation is requested. In this example, both of memory pools 120 and 124 may be dedicated to memory allocations of different sizes than one or more of requests 230(1)-(N). As a result, determination module 106 may determine that computing device 202 has yet to implement a memory pool dedicated to fixed memory chunks of the specific size.

As illustrated in FIG. 3, at step 330 one or more of the systems described herein may compute an amount of memory that is potentially wasted in part by satisfying the one or more requests from an existing memory pool dedicated to fixed memory chunks of a different size. For example, calculation module 108 may, as part of computing device 202 in FIG. 2, compute an amount of memory that is potentially wasted in part by satisfying the one or more of requests 230(1)-(N) from a memory pool dedicated to fixed memory chunks of a different size. In one example, this computation may include and/or represent a forward-looking estimate of and/or prediction on the amount of potentially wasted memory. Additionally or alternatively, this computation may include and/or represent a real-time sum of the amount of memory that has already been wasted at the point in time that the memory allocation is requested.

The systems described herein may perform step 330 in a variety of ways and/or contexts. In some examples, calculation module 108 may monitor and/or track the amount of memory that is potentially wasted in connection with requests for certain memory allocation sizes. Additionally or alternatively, calculation module 108 may sum up and/or keep a running log, tally, and/or count of the amount of memory potentially wasted in connection with requests for certain memory allocation sizes.

In some embodiments, calculation module 108 may identify and/or determine the amount of memory that has already been wasted in connection with requests for certain memory allocation sizes up to the present time. For example, calculation module 108 may identify and/or determine the amount of memory that has been wasted in connection with requests for 50-byte memory allocations up to the present time. In one example, allocation module 112 may satisfy and/or service those requests from the memory pool that is the best fit. In this example the best-fit memory pool may be the one whose memory chunks are (1) larger than or equal to the size requested and (2) closest in size to those requested. As a result, the best-fit memory pool may be capable of sourcing preallocated memory chunks that satisfy the requests with the smallest and/or lowest amount of loss and/or waste.

Continuing with this example, the best-fit memory pool for the 50-byte memory allocation requests may be dedicated to fixed memory chunks of sixty-four (64) bytes. In this example every time that allocation module 112 satisfies and/or services 50-byte memory allocation requests from that memory pool, fourteen (14) bytes of memory may be lost and/or wasted due to inefficiency. Accordingly, the size difference between the requested size and the sourced size may be fourteen (14) bytes. In other words, the per-request amount of waste may be fourteen (14) bytes.

In some examples, calculation module 108 may determine the number of requests for the specific size of memory allocation that have been and/or will be satisfied from the best-fit memory pool. For example, calculation module 108 may determine that ten (10) of the 50-byte memory allocation requests have been and/or will be satisfied from the 64-byte memory pool. In such examples, calculation module 108 may then multiply the per-request size difference and/or amount of waste by the number of requests that have been and/or will be satisfied from the 64-byte memory pool. For example, calculation module 108 may multiply the 14-byte size difference and/or amount of waste by the ten (10) memory allocation requests. In this example, calculation module 108 may calculate a total of one hundred and forty (140) bytes of memory that have been and/or will be wasted in connection with the 50-byte memory allocation requests.

In some examples, memory allocations may be forced and/or limited to certain byte alignments (e.g., 8-byte alignments). For example, allocation module 112 may round up the requested sizes to fit 8-byte alignments. In this example, allocation module 112 may round up the 50-byte memory allocation requests to fifty-six (56) bytes because fifty (50) is not a multiple of eight (8) but fifty-six (56) is a multiple of eight (8).

Continuing with this example, the 64-byte memory pool may still be the best fit for such requests whose sizes have been rounded up to fifty-six (56) bytes due to the forced 8-byte alignment. In this example, every time that allocation module 112 satisfies and/or services 56-byte memory allocation requests from that memory pool, eight (8) bytes of memory may be lost and/or wasted due to inefficiency. Accordingly, the size difference between the aligned size and the sourced size may be eight (8) bytes. In other words, the per-request amount of waste may rounded to eight (8) bytes.

Continuing with this example, calculation module 108 may determine that ten (10) of the rounded-up 56-byte allocation requests have been and/or will be satisfied from the 64-byte memory pool. In this example, calculation module 108 may then multiply the per-request size difference and/or amount of waste by the number of requests that have been and/or will be satisfied from the 64-byte memory pool. For example, calculation module 108 may multiply the 8-byte size difference and/or amount of waste by the ten (10) memory allocation requests. In this example, calculation module 108 may calculate a total of eighty (80) bytes of memory that have been and/or will be wasted in connection with the rounded-up 56-byte allocation requests.

In some examples, calculation module 108 may project and/or predict the amount of memory that would be wasted in connection with certain memory allocation requests based at least in part on an assumed continuation of past and/or present request trends and/or frequencies. For example, calculation module 108 may assume, for the sake of computation and/or prediction, that the same frequency of requests for 50-byte memory allocations will continue indefinitely. In this example, calculation module 108 may compute the amount of memory that would be wasted in the future if a new memory pool that more optimally matches the requested 50-byte size is not created. By doing so, calculation module 108 may be able to effectively estimate the amount of memory that would be wasted in the future without any optimization to the existing memory pool system.

Returning to FIG. 3, at step 340 one or more of the systems described herein may determine that the amount of memory that is potentially wasted exceeds a waste threshold. For example, determination module 106 may, as part of computing device 202 in FIG. 2, determine that the amount of memory that is potentially wasted exceeds a waste threshold 160. In this example, waste threshold 160 may include and/or represent a level of wasted memory that is unacceptable and/or too inefficient for one reason or another.

In other words, waste threshold 160 may constitute and/or represent a sub-optimal and/or non-ideal performance level of computing device 202.

The systems described herein may perform step 340 in a variety of ways and/or contexts. In some examples, determination module 106 may compare the amount of potentially wasted memory to waste threshold 160. In one example, determination module 106 may determine that the potentially wasted memory reaches and/or exceeds waste threshold 160 based at least in part on this comparison. In another example, determination module 106 may determine that the potentially wasted memory does not reach and/or exceed waste threshold 160 based at least in part on this comparison.

As a specific example, waste threshold 160 may constitute and/or represent one hundred and thirty (130) bytes of potentially wasted memory. In this example, if the computation indicates that one hundred and forty (140) bytes of memory have been and/or will be wasted in connection with 50-byte allocation requests, determination module 106 may determine that the 130-byte computation reaches and/or exceeds the 130-byte waste threshold. However, if the computation indicates that eighty (80) bytes of memory have been and/or will be wasted in connection with 50-byte allocation requests, determination module 106 may determine that the 80-byte computation does not reach and/or exceed the 130-byte waste threshold.

Figure 4:
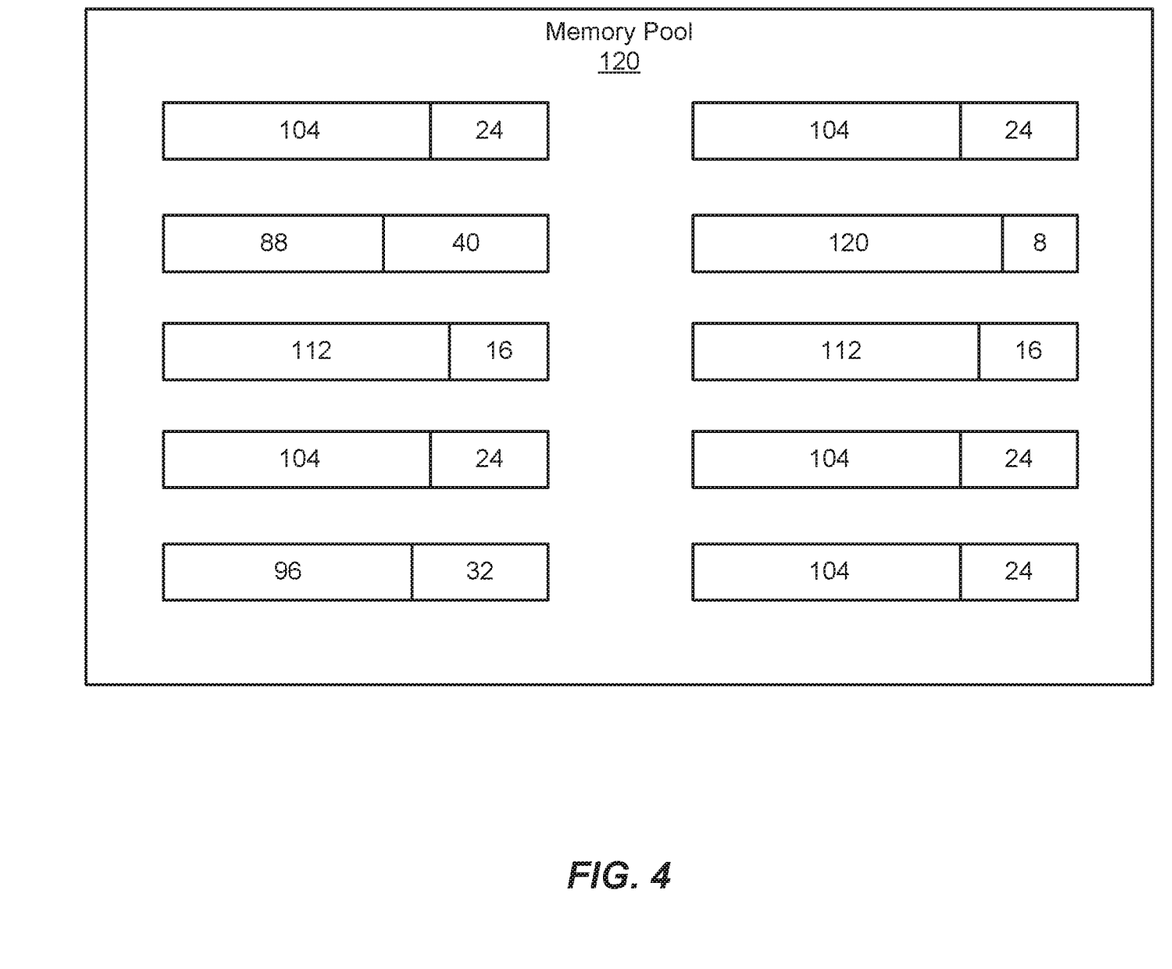
FIG. 4 is a block diagram of an exemplary dynamically sized memory pool based on tracked memory waste.

FIG. 4 is a block diagram of an exemplary implementation of memory pool 120. As illustrated in FIG. 4, memory pool 120 may include and/or represent a group of fixed memory chunks and/or allocations. In one example, the fixed memory chunks and/or allocations grouped in memory pool 120 may each represent one hundred and twenty-eight (128) bytes. In this example, the number illustrated on the left side of each memory chunk in FIG. 4 may indicate the requested size of memory that is non-optimally sourced from memory pool 120, and the number illustrated on the right side of each memory chunk in FIG. 4 may indicate the amount of memory wasted by such non-optimal sourcing from memory pool 120.

In some embodiments, the number illustrated on the left side of a memory chunk in FIG. 4 may correspond to and/or represent the rounded-up size of the requested memory allocation. In other embodiments the number illustrated on the left side of a memory chunk in FIG. 4 may correspond to and/or represent the precise size of the requested memory allocation. Although FIG. 4 illustrates memory pool 120 as including only ten (10) instances of 128-byte memory chunks, memory pool 120 may also include additional instances of 128-byte memory chunks that are not necessarily illustrated in FIG. 4.

In a specific example, allocation module 112 may receive five (5) requests for memory allocations of one hundred and four (104) bytes. In this example, allocation module 112 may satisfy those requests by sourcing five (5) instances of 128-byte memory chunks from memory pool 120. Each of these memory allocations may result in and/or cause twenty-four (24) bytes of waste. Accordingly, the total amount of waste resulting from and/or caused by these memory allocations may reach one hundred and twenty (120) bytes.

Continuing with this example, allocation module 112 may receive one (1) request for a memory allocation of eighty-eight (88) bytes. In this example, allocation module 112 may satisfy that request by sourcing a 128-byte memory chunk from memory pool 120. This memory allocation may result in and/or cause forty (40) bytes of waste. In addition, allocation module 112 may receive two (2) requests for memory allocations of one hundred and twelve (112) bytes. In this example, allocation module 112 may satisfy these requests by sourcing 128-byte memory chunks from memory pool 120. Each of these memory allocations may result in and/or cause sixteen (16) bytes of waste. Accordingly, the total amount of waste resulting from and/or caused by these memory allocations may reach thirty-two (32) bytes.

Continuing with this example allocation module 112 may receive one (1) request for a memory allocation of ninety-six (96) bytes. In this example, allocation module 112 may satisfy that request by sourcing a 128-byte memory chunk from memory pool 120. This memory allocation may result in and/or cause thirty-two (32) bytes of waste. In addition, allocation module 112 may receive one (1) request for a memory allocation of one hundred and twenty (120) bytes. In this example, allocation module 112 may satisfy that request by sourcing a 128-byte memory chunk from memory pool 120. This memory allocation may result in and/or cause eight (8) bytes of waste.

In one example, computing device 202 may set and/or implement a waste threshold of one hundred and twelve (112) bytes. In this example, because the total amount of waste resulting from and/or caused by the 104-byte allocation requests has reached one hundred and twenty (120) bytes, determination module 106 may determine that the 120-bytes of memory wasted in connection with the 104-byte allocation requests exceeds the 112-byte waste threshold. As will be described in greater detail below, in response to this determination, pooling module 110 may create a new memory pool dedicated to fixed memory chunks of one hundred and four (104) bytes on computing device 202.

In addition, because the total amount of waste resulting from and/or caused by all the other memory allocation requests has not reached the 112-byte waste threshold, determination module 106 may determine that the amounts of memory wasted in connection with those other memory allocation requests do not yet meet the criteria for triggering the creation of a new memory pool. As a result, in response to this determination, pooling module 110 may avoid creating a new memory pool dedicated to fixed memory chunks of one hundred and twelve (112) bytes, one hundred and twenty (120) bytes, ninety-six (96) bytes, or eighty-eight (88) bytes at that moment n time.

Figure 5:
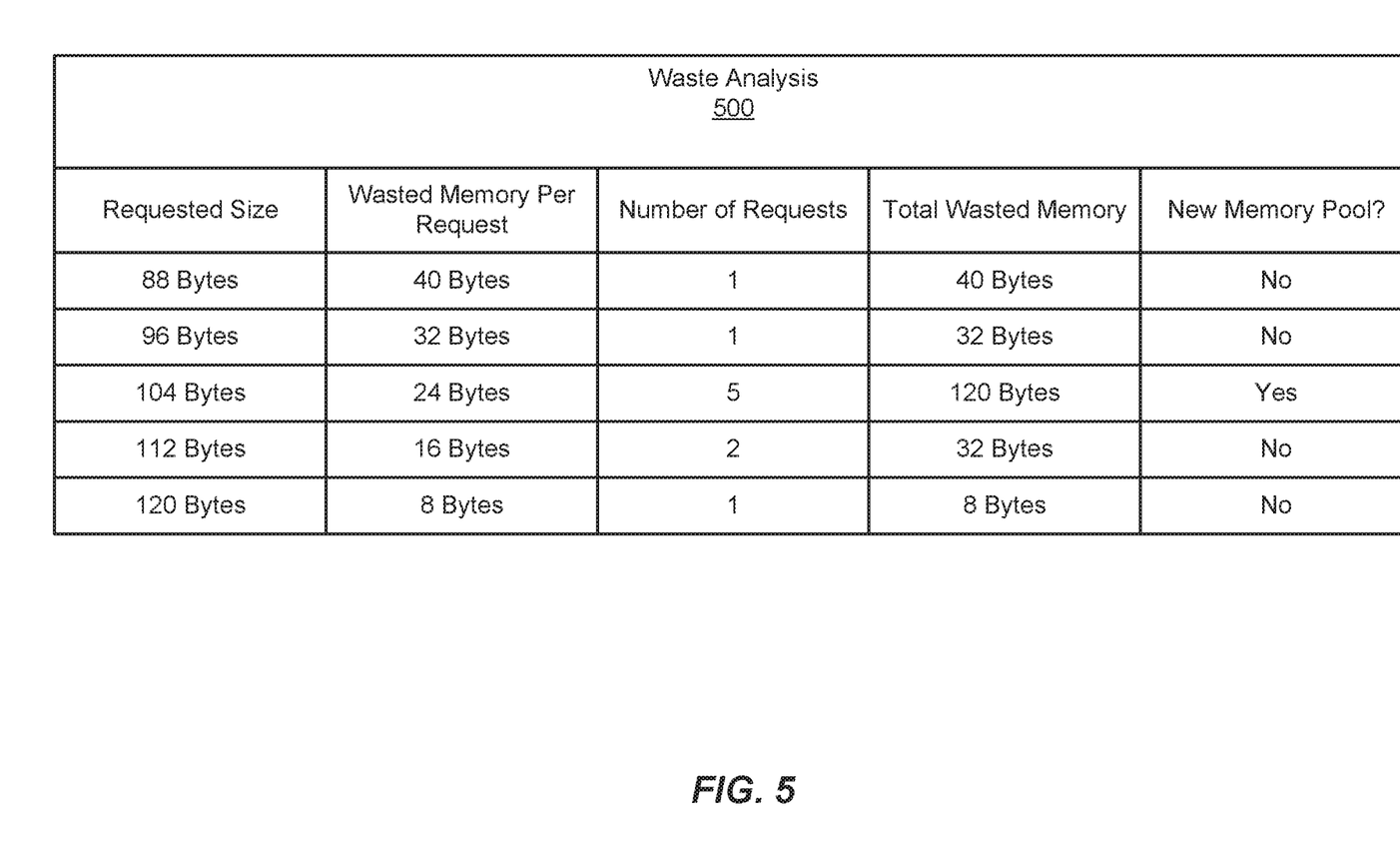
FIG. 5 is an illustration of an exemplary waste analysis performed in connection with dynamically sizing memory pools.

FIG. 5 is an illustration of an exemplary waste analysis 500 performed in connection with memory pool 120 in FIG. 4. As illustrated in FIG. 5, waste analysis 500 may indicate and/or demonstrate whether the memory allocation requests satisfied from memory pool 120 in FIG. 4 necessitate the creation of a new memory pool. In this example, and as described above in connection with FIG. 4, the 104-byte memory allocation requests may be the only ones that collectively meet the criteria for triggering the creation of a new memory pool.

Returning to FIG. 3, at step 350 one or more of the systems described herein may create an additional memory pool dedicated to fixed memory chunks of the specific size on the computing device. For example, pooling module 110 may, as part of computing device 202 in FIG. 2, create memory pool 124 dedicated to fixed memory chunks of the specific size on computing device 202. In this example, pooling module 110 may initiate and/or trigger the creation of memory pool 124 in response to the determination that the amount of potentially wasted memory exceeds waste threshold 160.

The systems described herein may perform step 350 in a variety of ways and/or contexts. In some examples, pooling module 110 may preallocate fixed memory chunks of the specific size within memory pool 124. Additionally or alternatively, pooling module 110 may group fixed memory chunks of the specific size together as memory pool 124.

Figure 6:
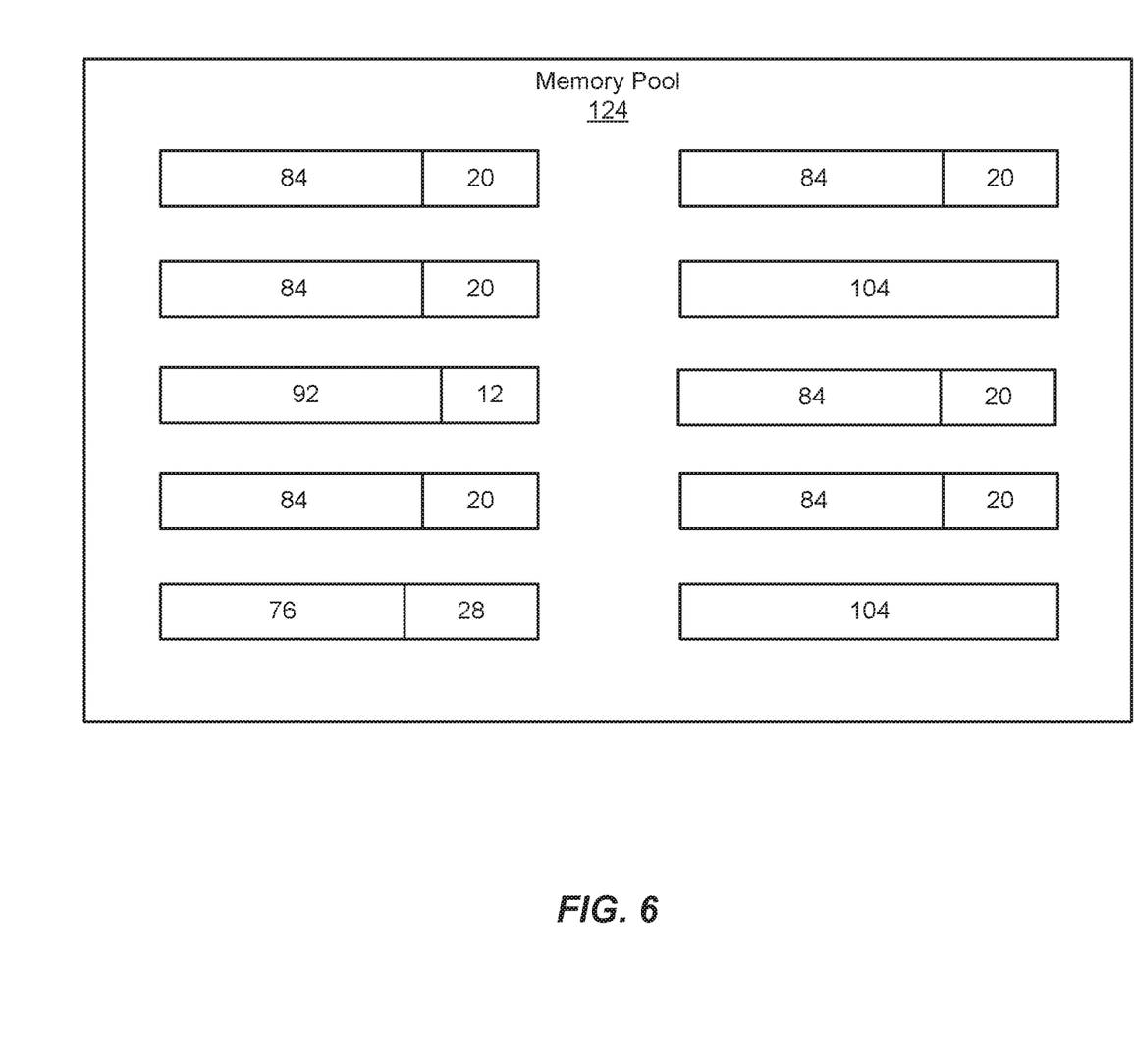
FIG. 6 is a block diagram of an additional exemplary dynamically sized memory pool based on tracked memory waste.

FIG. 6 is a block diagram of an exemplary implementation of memory pool 124. As illustrated in FIG. 6, memory pool 124 may include and/or represent a group of fixed memory chunks and/or allocations. In one example, the fixed memory chunks and/or allocations grouped in memory pool 124 may each represent one hundred and four (104) bytes. In this example, the number illustrated on the left side of each memory chunk in FIG. 6 may indicate the requested size of memory that is non-optimally sourced from memory pool 124, and the number illustrated on the right side of each memory chunk in FIG. 6 may indicate the amount of memory wasted by such non-optimal sourcing from memory pool 124.

In some embodiments, the number illustrated on the left side of a memory chunk in FIG. 6 may correspond to and/or represent the rounded-up size of the requested memory allocation. In other embodiments, the number illustrated on the left side of a memory chunk in FIG. 6 may correspond to and/or represent the precise size of the requested memory allocation. Although FIG. 6 illustrates memory pool 124 as including only ten (10) instances of memory 104-byte memory chunks, memory pool 124 may also include additional instances of 104-byte memory chunks that are not necessarily illustrated in FIG. 6.

Returning to the examples described above in connection with FIGS. 4 and 5, determination module 106 may determine that the 120-bytes of memory wasted in connection with the 104-byte allocation requests exceeds the 112-byte waste threshold. In response to this determination, pooling module 110 may create memory pool 124 dedicated to fixed memory chunks of one hundred and four (104) bytes on computing device 202.

In some examples, detection module 104 may detect a subsequent request for a memory chunk of the specific size. For example, after the creation of memory pool 124 in FIG. 6, detection module 104 may detect another request for a 104-byte memory allocation. In this example, allocation module 112 may satisfy this request by allocating one of the fixed memory chunks of one hundred and four (104) bytes from memory pool 124. This memory allocation may result in and/or cause no loss and/or waste as the requested size optimally matches the memory chunks preallocated in memory pool 124 in FIG. 6.

In other examples, detection module 104 may detect one or more subsequent requests for a memory chunk of a different smaller size. For example, after the creation of memory pool 124 in FIG. 6, detection module 104 may detect six (6) requests for an 84-byte memory allocation. In this example, each of these requests may result in and/or lead to twenty (20) bytes of waste. Accordingly, the total amount of waste resulting from and/or caused by these memory allocations may reach one hundred and twenty (120) bytes.

Continuing with this example, because the total amount of waste resulting from and/or caused by the 84-byte allocation requests has reached one hundred and twenty (120) bytes determination module 106 may determine that the 120-bytes of memory wasted in connection with the 84-byte allocation requests exceeds the 112-byte waste threshold. In response to this determination, pooling module 110 may create a new memory pool dedicated to fixed memory chunks of eighty-four (84) bytes on computing device 202.

In addition, because the total amount of waste resulting from and/or caused by all the other memory allocation requests represented in FIG. 6 has not reached the 112-byte waste threshold, determination module 106 may determine that the amounts of memory wasted in connection with those other memory allocation requests do not yet meet the criteria for triggering the creation of another new memory pool. As a result, in response to this determination, pooling module 110 may avoid creating a new memory pool dedicated to fixed memory chunks of ninety-two (92) bytes or seventy-six (76) bytes at that moment in time.

Figure 7:
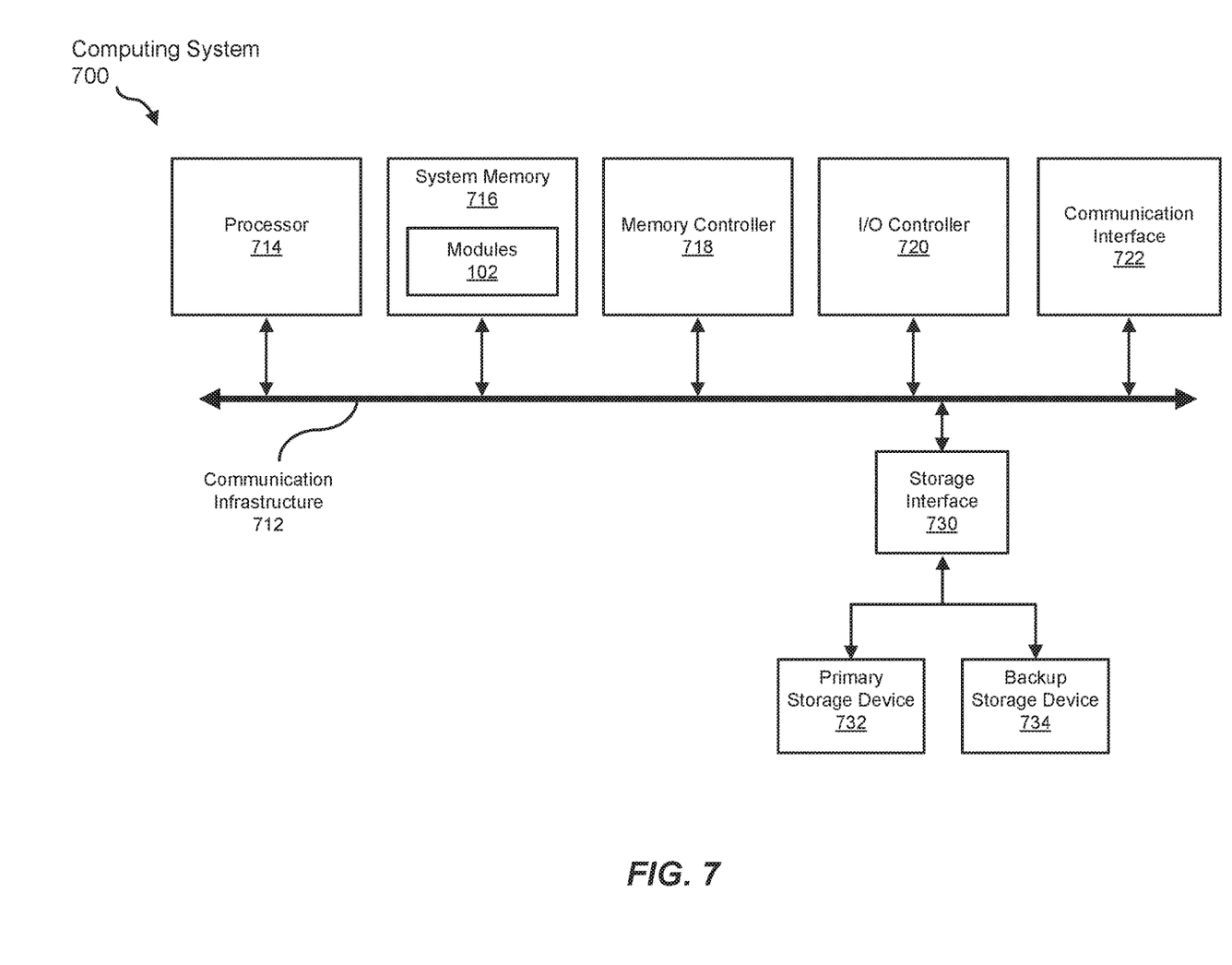
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (DATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   detecting one or more requests for a memory chunk of a specific size on a computing device;
   determining that the computing device has yet to implement a memory pool dedicated to fixed memory chunks of the specific size;
   computing an amount of memory that is potentially unused in part by satisfying the one or more requests from an existing memory pool dedicated to fixed memory chunks of a different size;
   determining that the amount of memory that is potentially unused exceeds a waste threshold; and
   in response to determining that the amount of memory that is potentially unused exceeds the waste threshold, creating an additional memory pool dedicated to fixed memory chunks of the specific size on the computing device.

2. The method of claim 1, further comprising:
   detecting a subsequent request for a memory chunk of the specific size; and
   satisfying the subsequent request by allocating one of the fixed memory chunks of the specific size from the additional memory pool in connection with the subsequent request.

3. The method of claim 1, wherein satisfying the one or more requests from the existing memory pool comprises allocating one or more of the fixed memory chunks of the different size from the existing memory pool in connection with the one or more requests.

4. The method of claim 1, wherein computing the amount of memory that is potentially unused comprises:
   calculating a size difference by subtracting the specific size from the different size;
   determining the number of requests for the specific size to be satisfied from the existing memory pool; and
   multiplying the size difference by the number of requests for the specific size to be satisfied from the existing memory pool.

5. The method of claim 1, wherein detecting the one or more requests for a memory chunk of the specific size comprises:
   identifying the number of bytes requested by the one or more requests;
   determining that the number of bytes requested by the one or more requests is not a multiple of a certain integer; and
   in response to determining that the number of bytes requested by the one or more requests is not a multiple of the certain integer, rounding the number of bytes up to a next multiple of the certain integer to reach the specific size.

6. The method of claim 1, further comprising determining that the one or more requests are each directed to allocating a memory chunk of the specific size by:

identifying, within the one or more requests, the specific size of memory chunk to be allocated in connection with the one or more requests;

identifying all existing memory pools of fixed memory sizes available on the computing device;

comparing the specific size of memory chunk identified within the one or more requests against the fixed memory sizes; and determining, based at least in part on the comparison, that the specific size of memory chunk identified within the one or more requests differs from the fixed memory sizes.

7. The method of claim 1, wherein the specific size comprises a size of memory chunk that is distinct from all sizes of fixed memory chunks included in existing memory pools on the computing device.

8. The method of claim 1, further comprising:
detecting one or more additional requests for a memory chunk of an additional size;
computing an additional amount of memory that is potentially unused in part by satisfying the one or more additional requests from the existing memory pool;
determining that the additional amount of memory that is potentially unused by satisfying the one or more additional requests from the existing memory pool does not exceed the waste threshold;
detecting a further request for a memory chunk of the additional size; and
satisfying the further request by allocating one of the fixed memory chunks of the different size from the existing memory pool in connection with the further request due at least in part to the additional amount of memory not exceeding the waste threshold.

9. The method of claim 1, further comprising:
detecting one or more additional requests for a memory chunk of an additional size;
computing an additional amount of memory that is potentially unused by satisfying the one or more additional requests from the existing memory pool;
determining that the additional amount of memory that is potentially unused exceeds the waste threshold; and
in response to determining that the additional amount of memory that is potentially unused exceeds the waste threshold, creating a further memory pool dedicated to fixed memory chunks of the additional size on the computing device.

10. The method of claim 9, further comprising:
detecting a subsequent request for a memory chunk of the additional size; and
satisfying the subsequent request by allocating one of the fixed memory chunks of the additional size from the further memory pool in connection with the subsequent request.

11. The method of claim 1, wherein:
the different size comprises a power-of-two byte count; and
the specific size comprises a byte count that is not a power of two.

12. A system comprising:
a detection module, stored in memory on a computing device, that detects one or more requests for a memory chunk of a specific size;
a determination module, stored in memory on the computing device, that determines that the computing device has yet to implement a memory pool dedicated to fixed memory chunks of the specific size;
a calculation module, stored in memory on the computing device, that computes an amount of memory that is potentially unused in part by satisfying the one or more requests from an existing memory pool dedicated to fixed memory chunks of a different size;
wherein the determination module further determines that the amount of memory that is potentially unused exceeds a waste threshold;
a pooling module, stored in memory on the computing device, that creates an additional memory pool dedicated to fixed memory chunks of the specific size in response to the determination that the amount of memory that is potentially unused exceeds the waste threshold; and
at least one physical processing device configured to execute the detection module, the calculation module, the determination module, and the pooling module.

13. The system of claim 12, wherein the detection module detects a subsequent request for a memory chunk of the specific size; and
further comprising an allocation module, stored in memory on the computing device, that satisfies the subsequent request by allocating one of the fixed memory chunks of the specific size from the additional memory pool in connection with the subsequent request.

14. The system of claim 13, wherein the allocation module satisfies the one or more requests from the memory pool by allocating one or more of the fixed memory chunks of the different size from the existing memory pool in connection with the one or more requests.

15. The system of claim 12, wherein the calculation module computes the amount of memory that is potentially unused by:
calculating a size difference by subtracting the specific size from the different size;
determining the number of requests for the specific size to be satisfied from the existing memory pool; and
multiplying the size difference by the number of requests for the specific size to be satisfied from the existing memory pool.

16. The system of claim 12, wherein:
the determination module:
identifies the number of bytes requested by the one or more requests; and
determines that the number of bytes requested by the one or more requests is not a multiple of a certain integer; and
the calculation module rounds the number of bytes up to a next multiple of the certain integer to reach the specific size in response to the determination that the number of bytes requested by the one or more requests is not a multiple of the certain integer.

17. The system of claim 12, wherein the determination module determines that the one or more requests are each directed to allocating a memory chunk of the specific size by:
identifying, within the one or more requests, the specific size of memory chunk to be allocated in connection with the one or more requests;
identifying all existing memory pools of fixed memory sizes available on the computing device;
comparing the specific size of memory chunk identified within the one or more requests against the fixed memory sizes; and determining, based at least in part on the comparison, that the specific size of memory chunk identified within the one or more requests differs from the fixed memory sizes.

18. The system of claim 12, wherein the specific size comprises a size of memory chunk that is distinct from all sizes of fixed memory chunks included in existing memory pools on the computing device.

19. The system of claim 12, wherein:
the detection module detects one or more additional requests for a memory chunk of an additional size;
the calculation module computes an additional amount of memory that is potentially unused in part by satisfying the one or more additional requests from the existing memory pool;
the determination module determines that the additional amount of memory that is potentially unused by satisfying the one or more additional requests from the existing memory pool does not exceed the waste threshold; and
the detection module detects a further request for a memory chunk of the additional size; and
further comprising an allocation module, stored in memory on the computing device, that satisfies the further request by allocating one of the fixed memory chunks of the different size from the existing memory pool in connection with the further request due at least in part to the additional amount of memory not exceeding the waste threshold.

20. An apparatus comprising:
a memory device that includes a plurality of memory chunks of a fixed size; and
at least one physical processing device communicatively coupled to the memory device, wherein the physical processing device:
detects one or more requests for a memory chunk of a specific size;
determines that the memory device has yet to implement a memory pool dedicated to memory chunks of the specific size;
computes an amount of memory that is potentially unused in part by satisfying the one or more requests from an existing memory pool dedicated to the memory chunks of the fixed size;
determines that the amount of memory that is potentially unused exceeds a waste threshold; and
creates an additional memory pool dedicated to memory chunks of the specific size in response to determining that the amount of memory that is potentially unused exceeds the waste threshold.

* * * * *